United States Patent
Taniguchi

(10) Patent No.: US 7,624,837 B2
(45) Date of Patent: Dec. 1, 2009

(54) HYDRAULIC POWER STEERING APPARATUS

(75) Inventor: Yoji Taniguchi, Okazaki (JP)

(73) Assignee: JTEKT Corporation, Osaka (JP)

( * ) Notice: Subject to any disclaimer, the term of this patent is extended or adjusted under 35 U.S.C. 154(b) by 65 days.

(21) Appl. No.: 12/084,089

(22) PCT Filed: Oct. 19, 2006

(86) PCT No.: PCT/JP2006/320860

§ 371 (c)(1),
(2), (4) Date: Apr. 25, 2008

(87) PCT Pub. No.: WO2007/049505

PCT Pub. Date: May 3, 2007

(65) Prior Publication Data

US 2009/0026002 A1     Jan. 29, 2009

(30) Foreign Application Priority Data

Oct. 28, 2005     (JP)     ............................. 2005-313902

(51) Int. Cl.
*B62D 5/065*     (2006.01)
*B62D 5/00*     (2006.01)
*B62D 6/00*     (2006.01)

(52) U.S. Cl. ........................ 180/441; 180/442; 180/417; 180/421; 180/422; 701/44

(58) Field of Classification Search ................. 180/417, 180/421, 422, 441, 442, 446; 701/41, 44
See application file for complete search history.

(56) References Cited

U.S. PATENT DOCUMENTS 3,470,758 A * 10/1969 Liebert .................... 74/388 PS 4,718,514 A * 1/1988 Hirakushi ................... 180/422

(Continued)

FOREIGN PATENT DOCUMENTS

JP     2000-229578     8/2000

(Continued)

*Primary Examiner*—Paul N Dickson
*Assistant Examiner*—Daniel Yeagley
(74) *Attorney, Agent, or Firm*—Jordan and Hamburg LLP

(57) ABSTRACT

In a hydraulic power steering apparatus, hydraulic pressure for generating steering assist power is varied by varying opening of a variable throttle portion by movement of a spool. The spool is disposed in a provisional origin by driving a stepping motor in one direction according to a number of steps for setting provisional origin from a position at a time of start of control, and the number of steps at a time of completing of the driving is set to a provisional origin for calculation. In a return to origin permission state where the spool is disposed in a provisional origin and the number of steps from the provisional origin for calculation is zero, a number of steps at a time when the driving of the stepping motor according to a number of steps obtained by subtracting the number of steps for setting provisional origin from a number of steps for setting origin is completed is set to an origin for calculation, and the movement of the spool is stopped at the origin with a stopper. After setting the origin for calculation, a number of steps from the origin for calculation instead of the provisional origin for calculation is set according to the vehicle driving condition for positioning the spool.

6 Claims, 13 Drawing Sheets

U.S. PATENT DOCUMENTS

| | | | |
|---|---|---|---|
| 4,730,687 A * | 3/1988 | Chikuma et al. | 180/422 |
| 5,682,745 A * | 11/1997 | Phillips | 60/431 |
| 5,791,433 A * | 8/1998 | Murakami et al. | 180/417 |
| 6,298,940 B1 * | 10/2001 | Bohner et al. | 180/403 |
| 6,390,228 B2 * | 5/2002 | Serizawa et al. | 180/403 |
| 6,547,030 B1 * | 4/2003 | Nomura et al. | 180/441 |

FOREIGN PATENT DOCUMENTS

| | | |
|---|---|---|
| JP | 2002-233189 | 8/2002 |
| JP | 2005-297757 | 10/2005 |
| JP | 2007196917 A * | 8/2007 |

* cited by examiner

[Fig. 1]
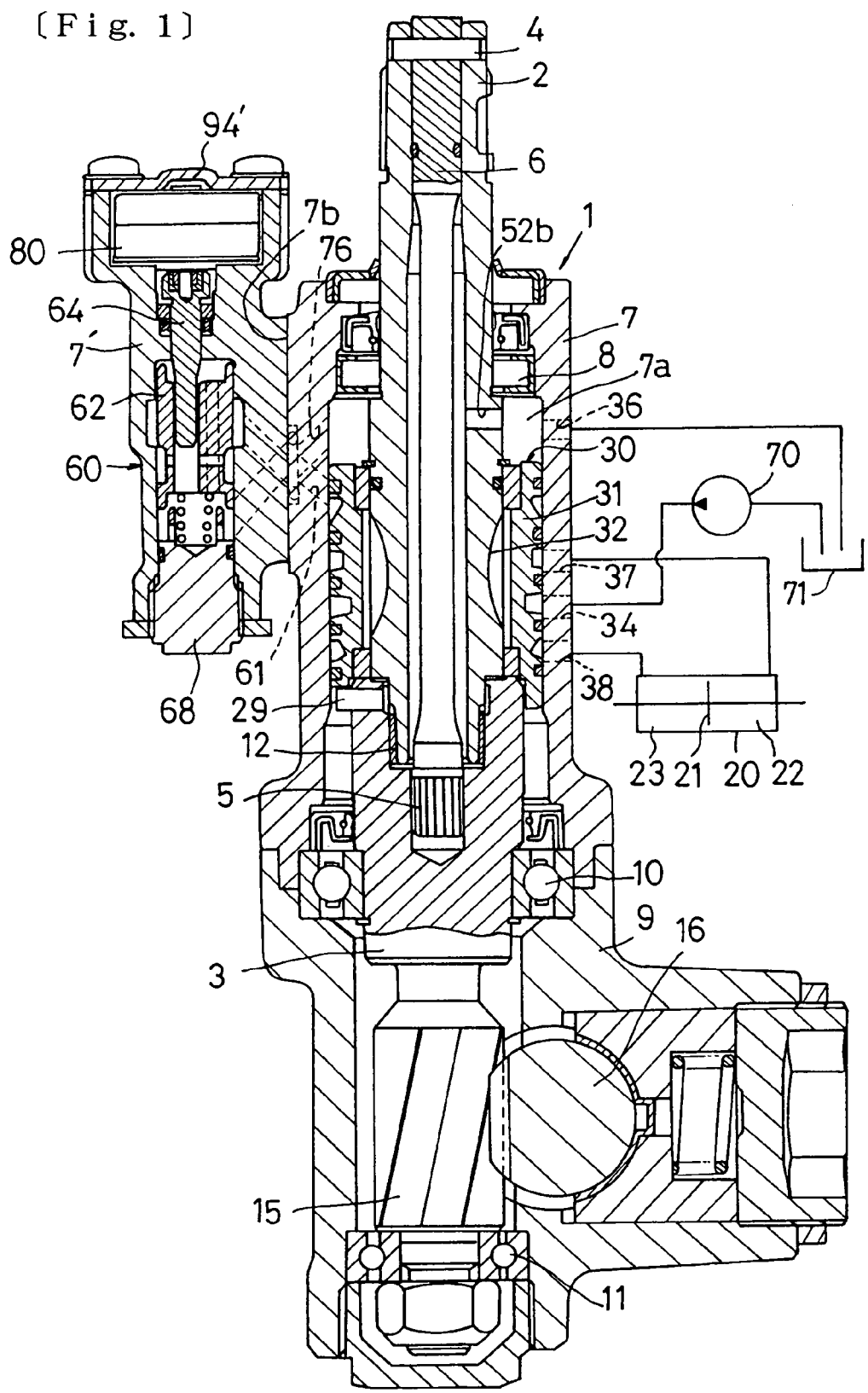

[Fig. 2]
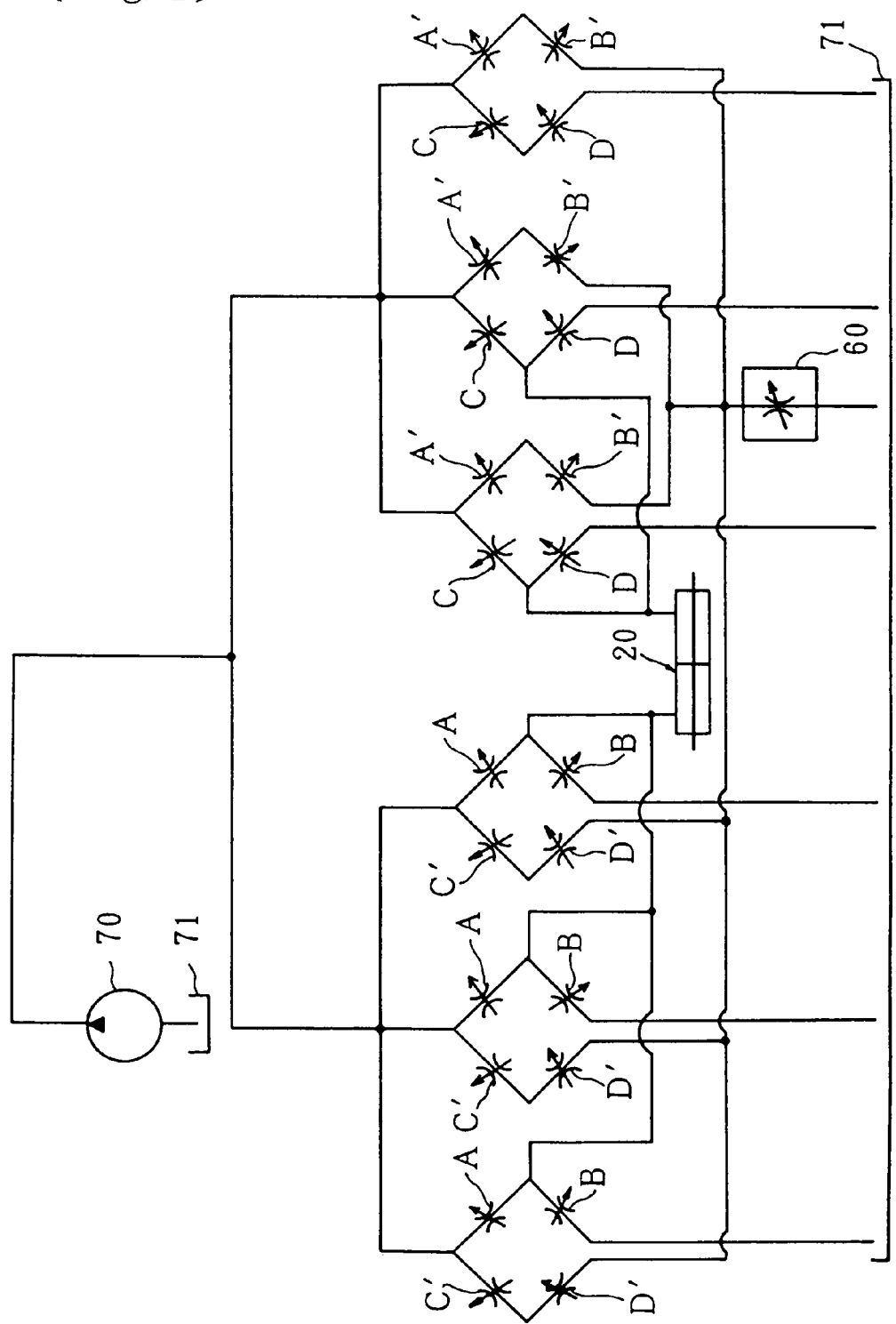

[Fig. 3]
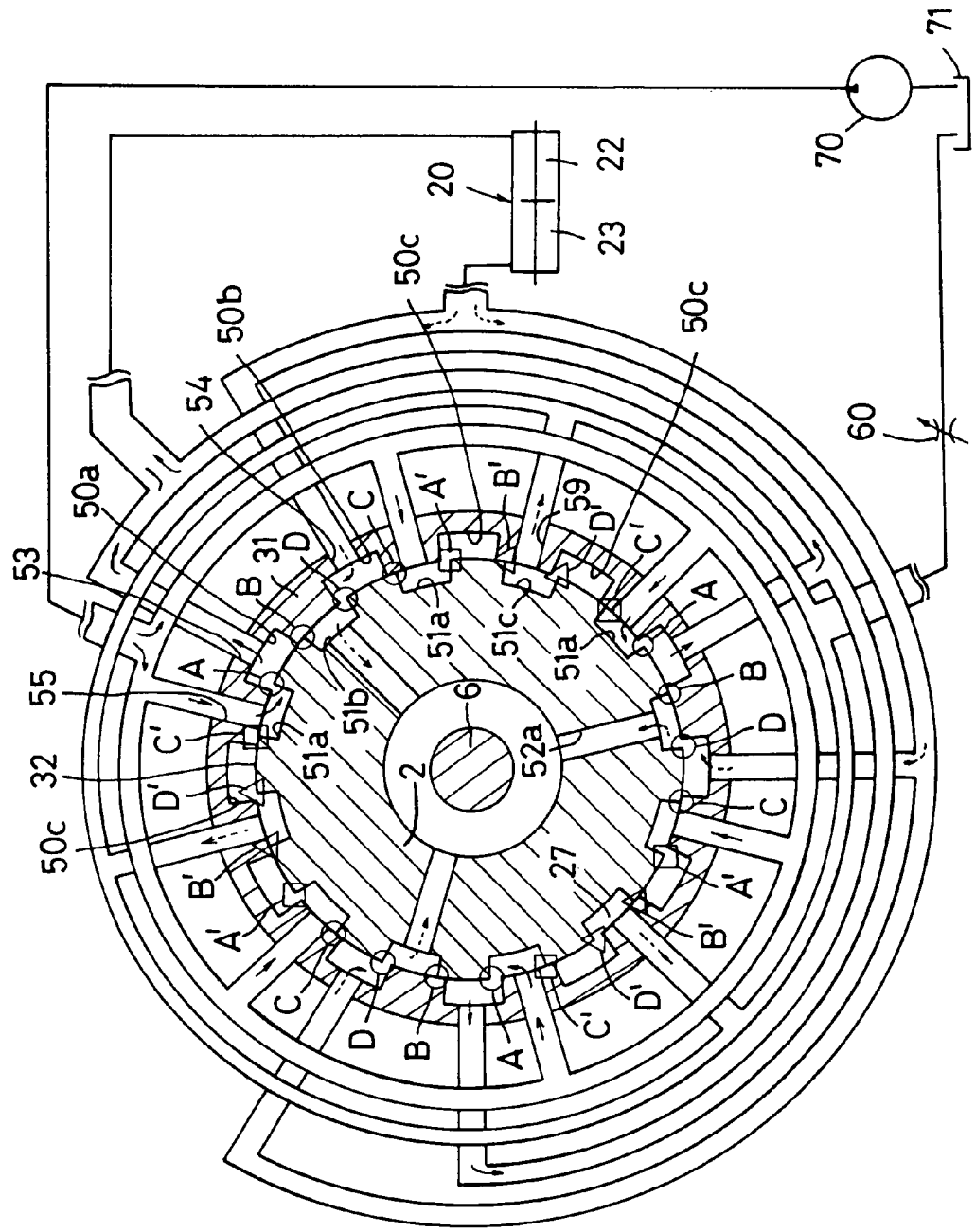

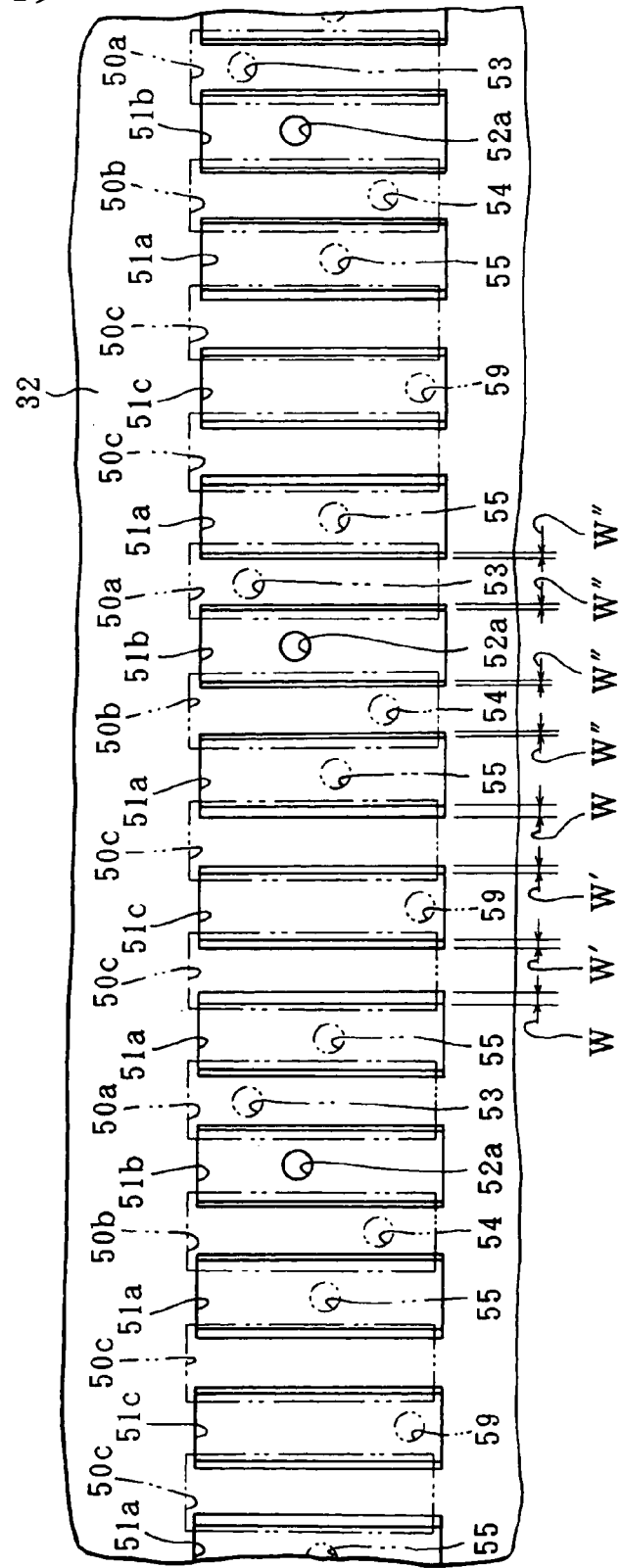
[Fig. 4]

[Fig. 5]
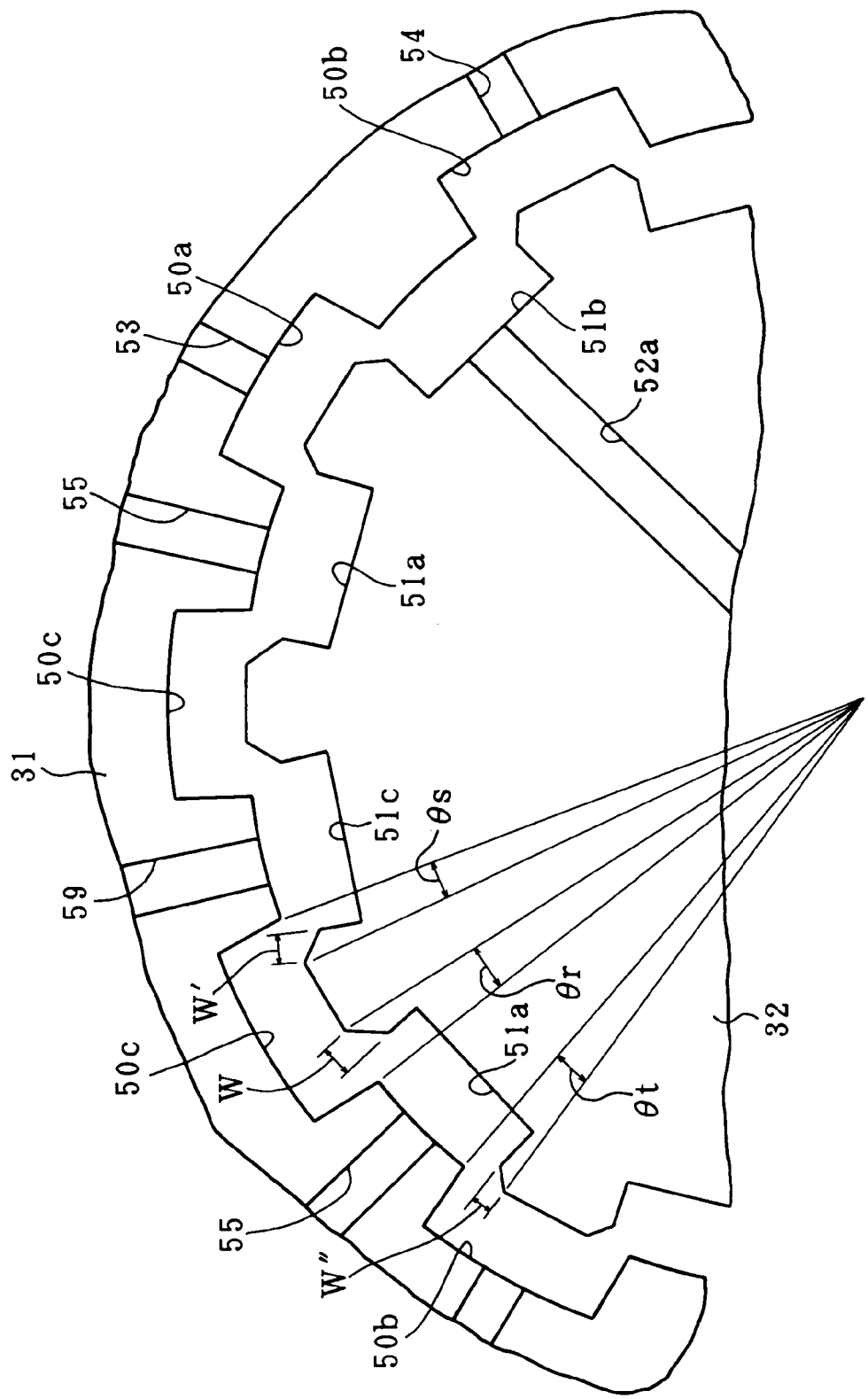

[Fig. 6]
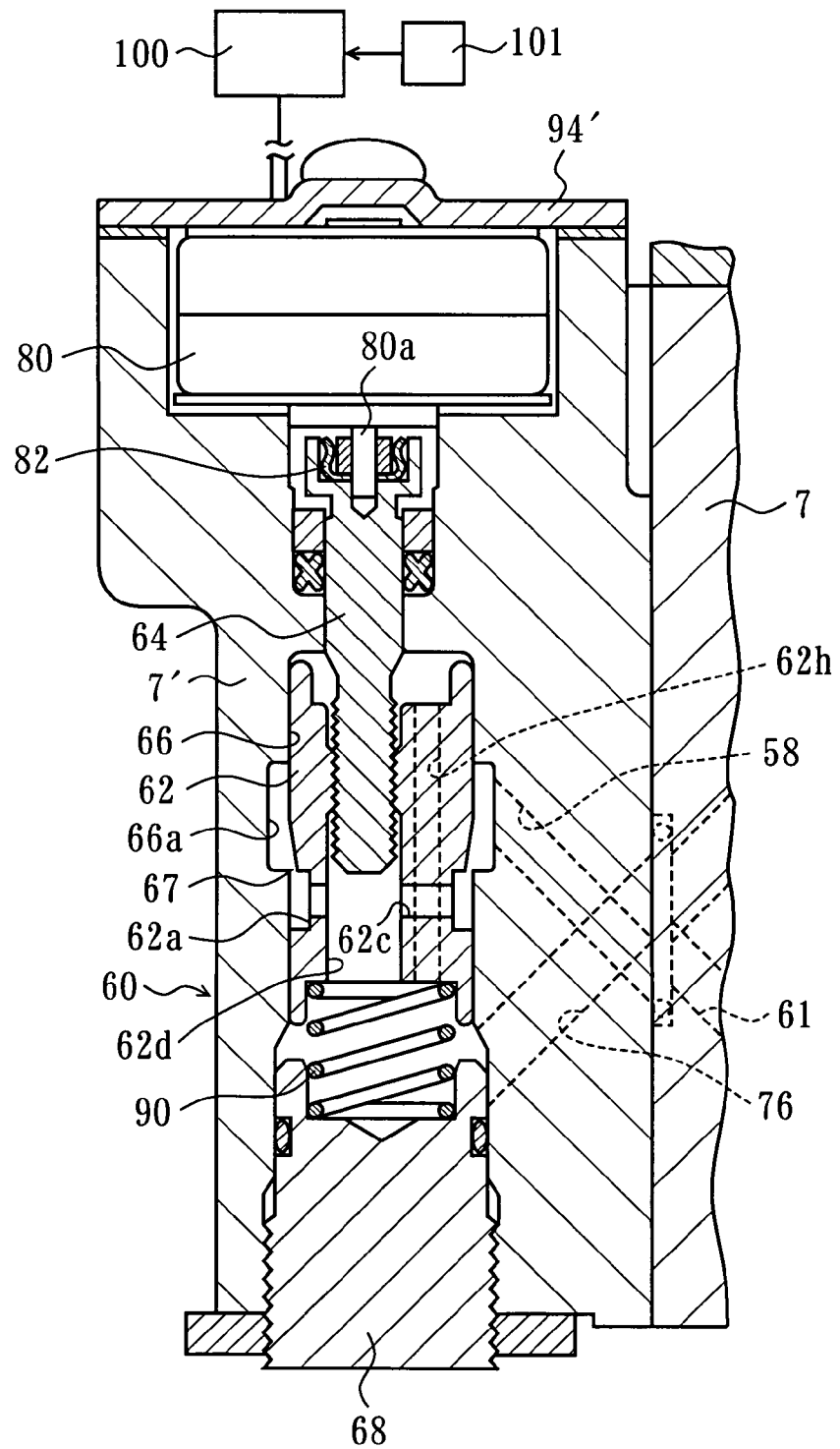

[Fig. 7]
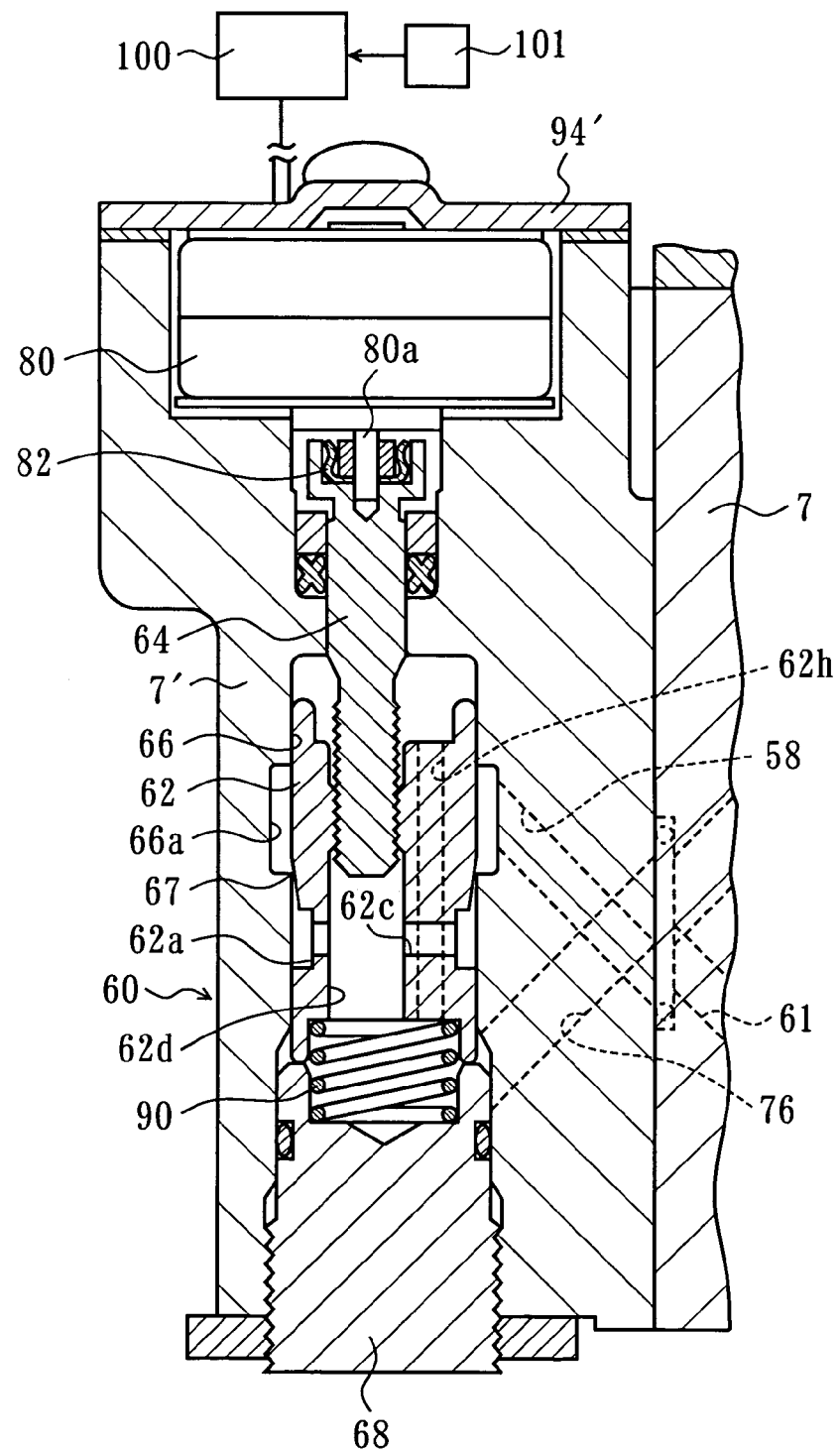

[Fig. 8]
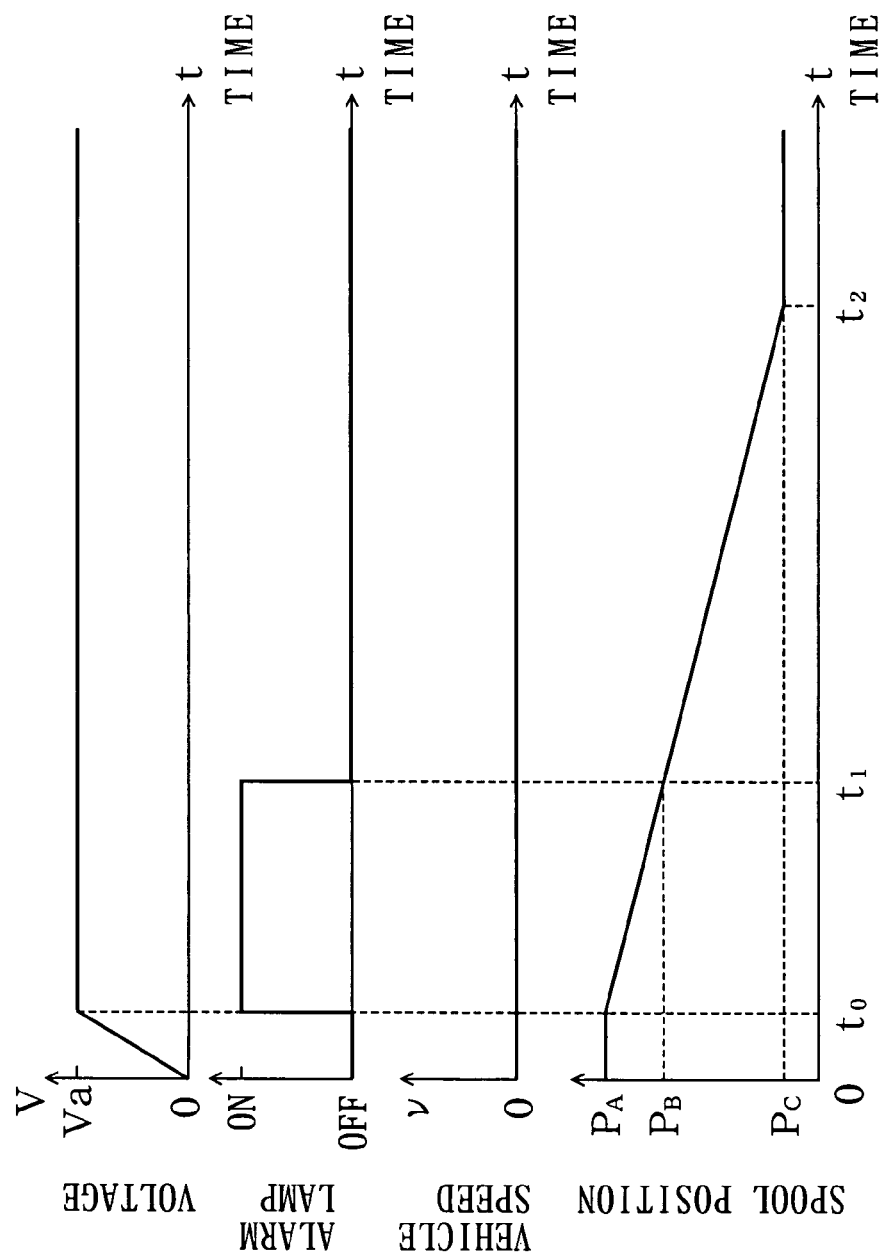

[Fig. 9]
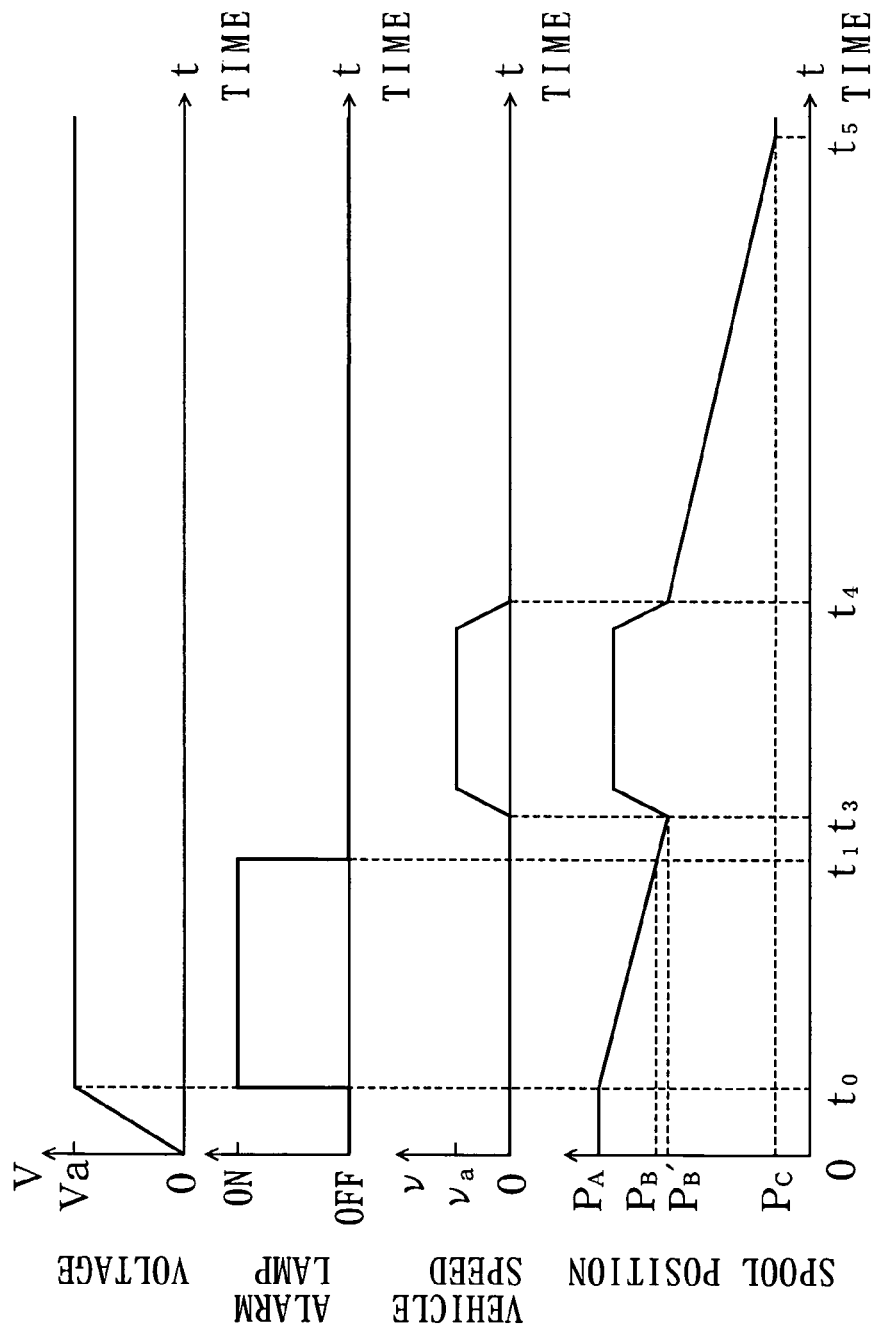

[Fig. 10]
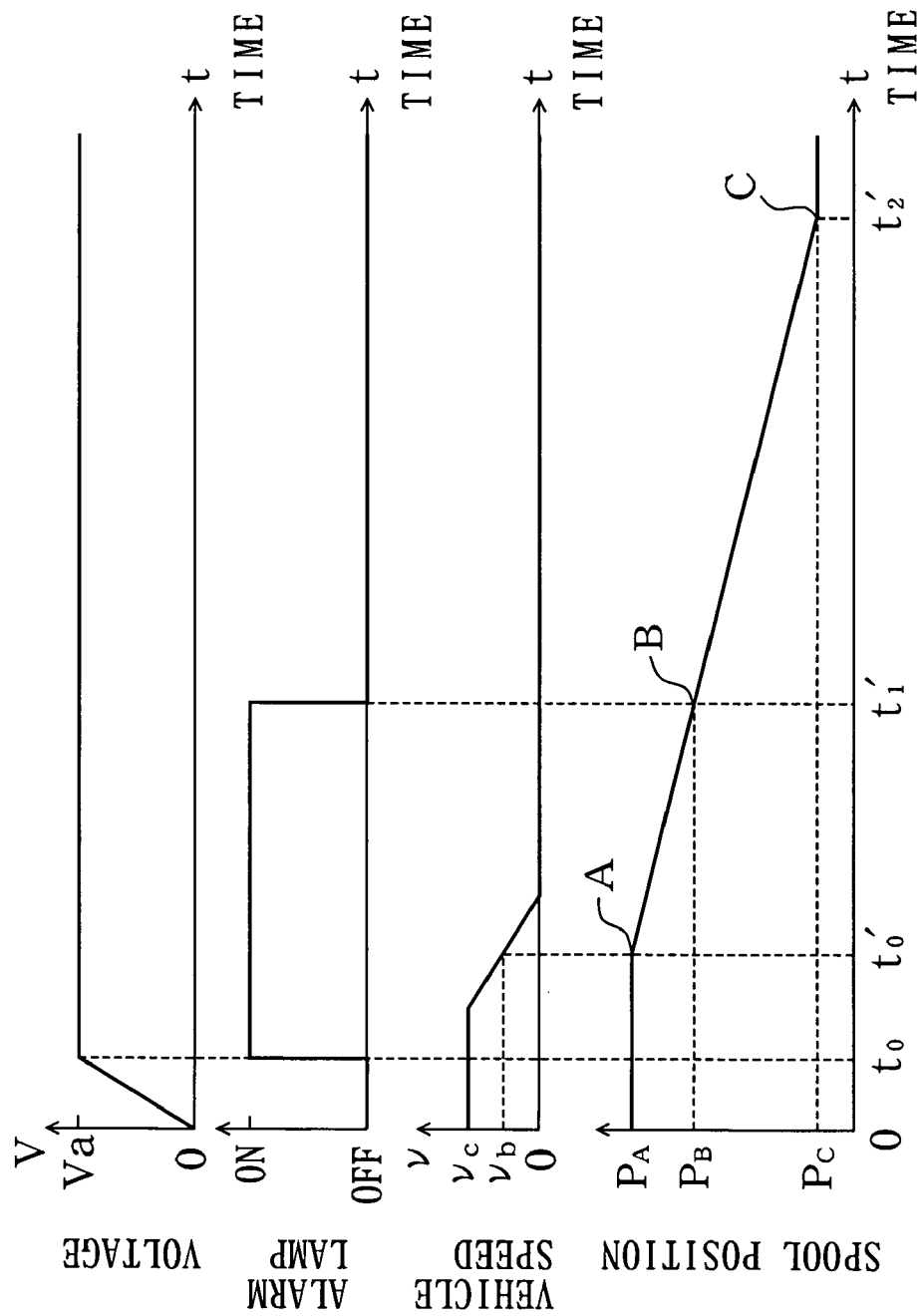

[Fig. 11]
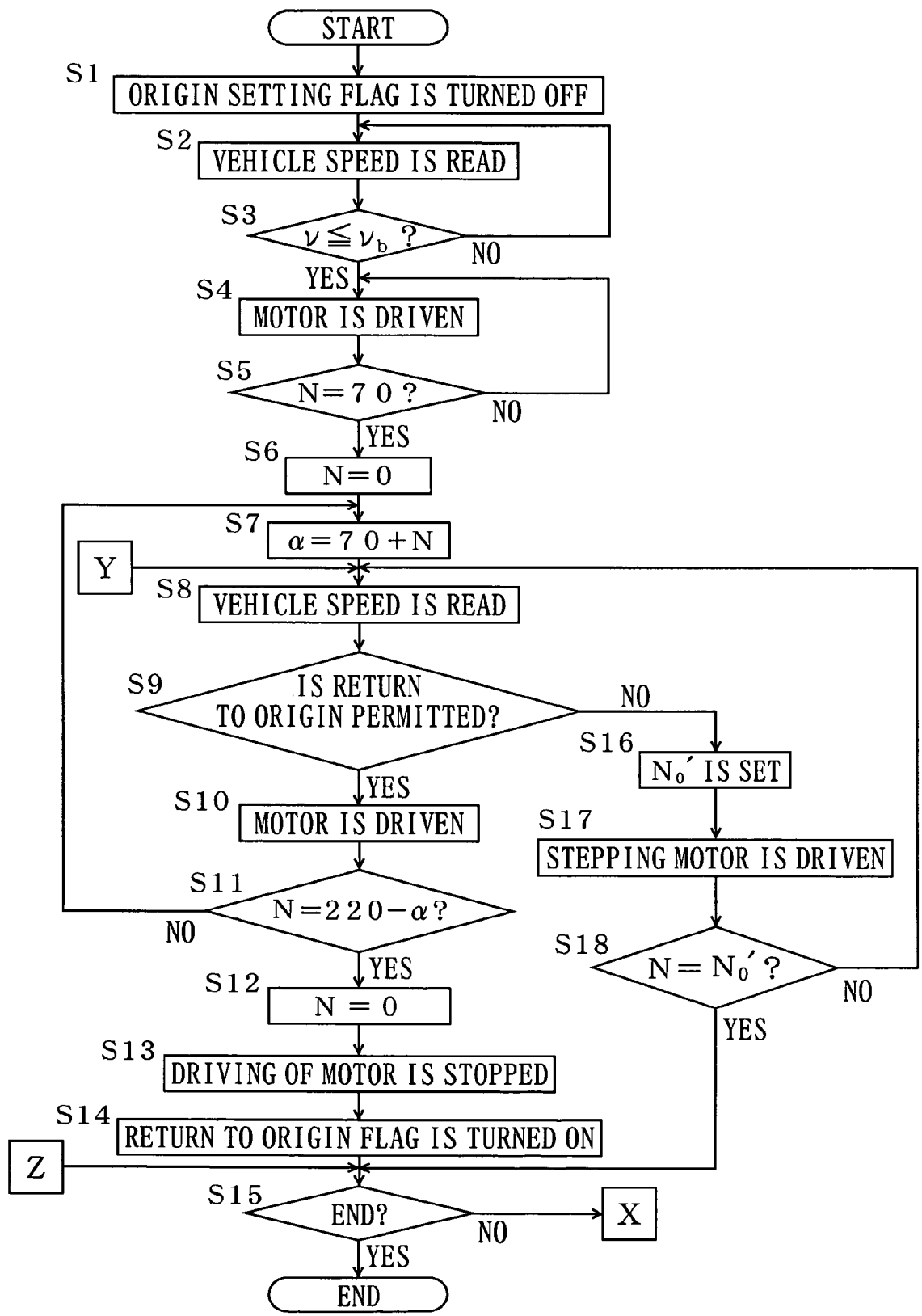

[Fig. 12]
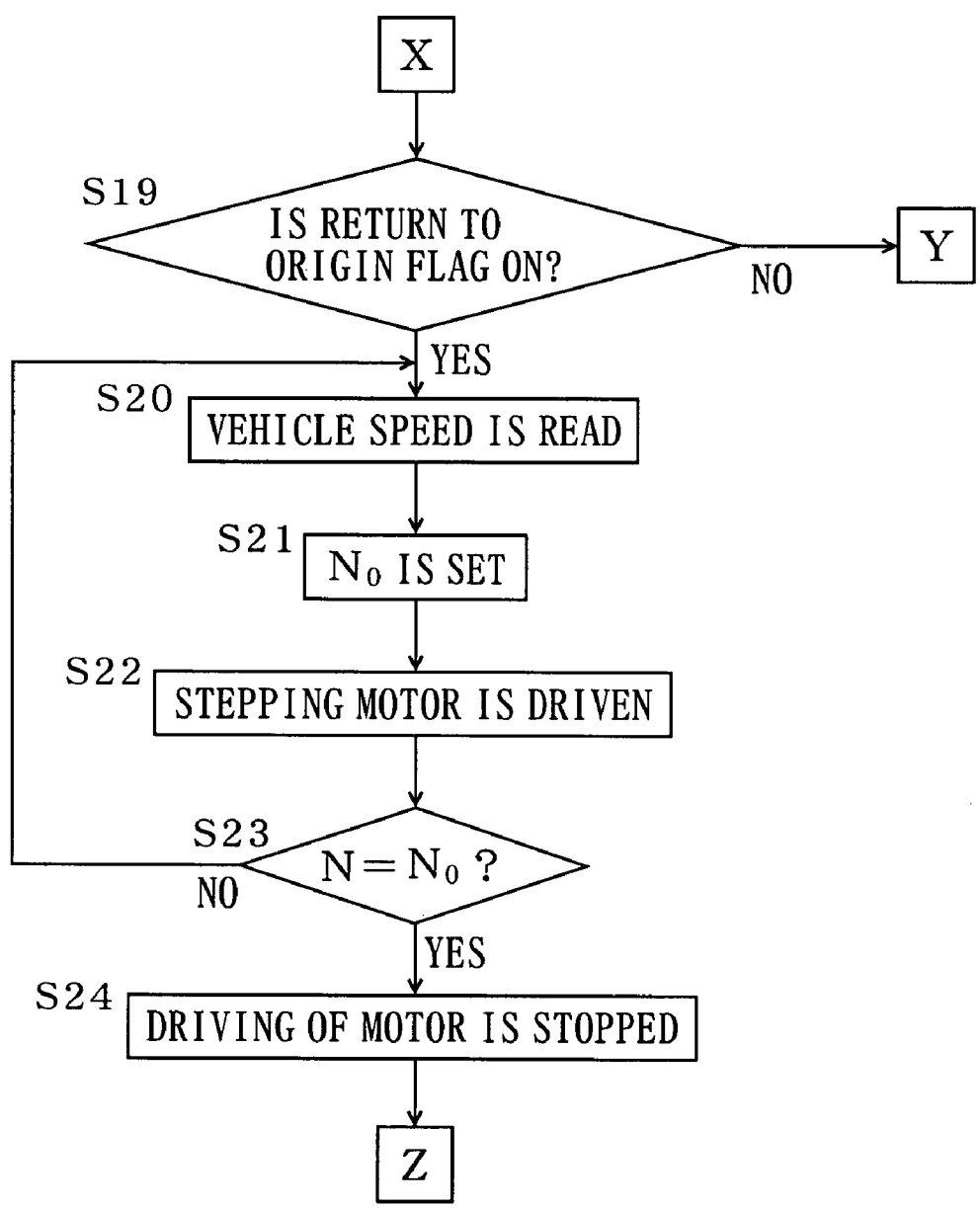

[Fig. 13]
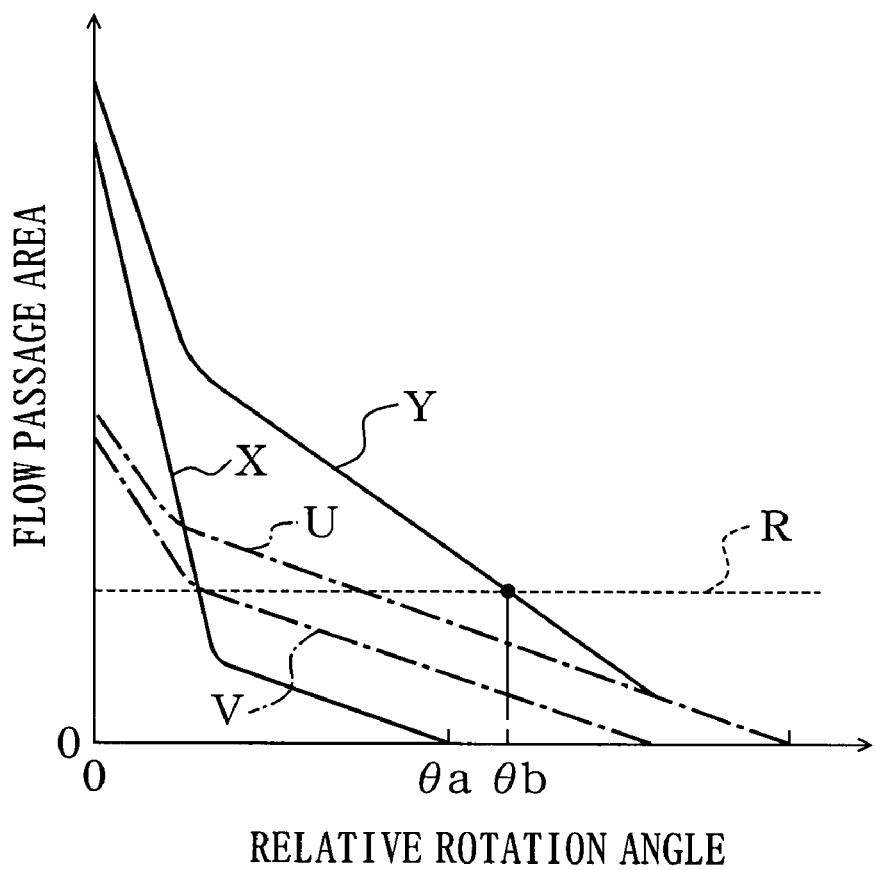

HYDRAULIC POWER STEERING APPARATUS

BACKGROUND OF THE INVENTION

The present invention relates to a hydraulic power steering apparatus in which the steering assist power can be varied by controlling a stepping motor according to a vehicle driving condition.

In order to vary the steering assist power according to the vehicle driving condition, for example, vehicle speed in a hydraulic power steering apparatus, a stepping motor that moves a spool of a variable throttle valve provided in a hydraulic circuit is driven according to the number of steps that is set according to the vehicle driving condition (see Patent Document 1).

In order to set accurately the degree of opening of a variable throttle portion in such variable throttle valve, it is necessary to perform accurate positioning of the spool by controlling the stepping motor. For this purpose, the origin corresponding to the actual reference position of the spool is required to match the origin for calculation that serves as a reference for calculating the number of steps.

Accordingly, a stopper that can stop the movement of the spool in one direction is provided in the origin, the number of steps for setting origin that is required for moving the spool to the origin is predetermined, and the stepping motor is driven according to the number of steps for setting origin at the time when the control is started. As a result, the spool is positioned in the origin at the time when the driving of the stepping motor according to the number of steps for setting origin is completed therefore, the value of the number of steps at this time is set as the origin for calculation.

Patent Document 1: Japanese Patent Application Laid-open No. 2000-229578

SUMMARY OF THE INVENTION

When the stepping motor is controlled according to, for example, vehicle speed, the variable throttle portion is closed by positioning the spool in the origin when the vehicle speed is zero, and as the vehicle speed increases, the degree of opening of the variable throttle portion is increased by moving the spool away from the origin. As a result the steering assist power is decreased when the vehicle speed increased. Such control of the stepping motor is usually started and ended as the ignition switch of the vehicle is turned on and off. A typical driver turns the ignition switch off when the vehicle speed is zero or close to zero, whereby the spool is disposed in the origin or close thereto when the control of the stepping motor ends.

However, there are also drivers who turn the ignition switch off during the vehicle travels, for example, in downhill, so that the vehicle travels to the stop position by inertia. In such case because the vehicle speed at the time when the control of the stepping motor has ended is high, the spool is disposed at a distance from the origin. For this reason, the number of steps for setting origin is set on the assumption that the spool is disposed in a position farthest from the origin in order that the spool can be moved reliably to the origin when the control of the stepping motor is started again.

In this case, because the number of steps for setting origin is large, a long time is required to complete the driving according to the number of steps for setting origin at a time when the control of the stepping motor is started; therefore, a long time elapses before the origin for calculation is set. Because the steering assist power cannot be controlled according to the vehicle driving condition before the origin is set, the interval in which the steering feeling is degraded is increased at the initial stage of the driving of the vehicle.

It is an object of the present invention to provide a hydraulic power steering apparatus that can resolve the above-described problems.

The hydraulic power steering apparatus in accordance with the present invention comprises a variable throttle valve that has a variable throttle portion in which the degree of opening is varied by movement of a spool and varies hydraulic pressure for generating steering assist power by this variation of the degree of opening; a stepping motor for moving the spool in one direction and the other direction; means for driving the stepping motor according to a number of steps a stopper that can stop the movement of the spool in the one direction at an origin; means for storing a predetermined number of steps that is required to move the spool to the origin as a number of steps for setting origin; means for storing a number of steps that is less than the number of steps for setting origin and is predetermined for moving the spool in the one direction from a position at a time when a control of the stepping motor starts as a number of steps for setting provisional origin; means for setting a number of steps at a time when the driving of the stepping motor according to the number of steps for setting provisional origin is completed to a provisional origin for calculation, on the assumption that the spool is positioned in a provisional origin when the driving of the stepping motor according to the number of steps for setting provisional origin is completed; means for setting a number of steps from the provisional origin for calculation that corresponds to an amount of movement of the spool from the provisional origin in the other direction according to a vehicle driving condition; means for determining whether it is in a return to origin permission state in which conditions for return to the origin are satisfied, these conditions including a condition that the spool is disposed in the provisional origin and a condition that the number of steps from the provisional origin for calculation set according to the vehicle driving condition is zero; and means for setting a number of steps at a time when the driving of the stepping motor according to a number of steps obtained by subtracting the number of steps for setting provisional origin from the number of steps for setting origin is completed to an origin for calculation, in the return to origin permission state; wherein instead of the number of steps from the provisional origin for calculation, the number of steps from the origin for calculation that corresponds to the amount of movement of the spool from the origin in the other direction is set according to the vehicle driving condition, after the origin for calculation is set; and the spool is positioned by driving the stepping motor according to the number of steps that is set according to the vehicle driving condition.

According to the present invention, in the initial stage of the control of the stepping motor, when the driving of the stepping motor according to the number of steps for setting provisional origin is completed, a number of steps at this time is set to a provisional origin for calculation, on the assumption that the spool is positioned in the provisional origin at this time. The number of steps from the provisional origin for calculation corresponding to the amount of movement of the spool from the provisional origin in the other direction is set according to the vehicle driving condition. The spool is positioned by driving the stepping motor according to the number of steps set according to the vehicle driving condition, and thus the steering assist power that corresponds to the vehicle driving condition can be obtained.

Because the number of steps for setting provisional origin is less than the number of steps for setting origin, the provisional origin for calculation can be set faster than the origin for calculation. As a result, the steering assist power corresponding to the vehicle driving condition can be obtained faster than in the conventional apparatuses, and it is possible to shorten the interval in which the control of the stepping motor according to the driving condition is restricted at the initial stage of the driving of the vehicle.

Although a difference can occur between the provisional origin for calculation and the origin for calculation because the provisional origin does not always matches the origin, the steering feeling can still be improved in comparison with the case in which the steering assist power does not at all correspond to the vehicle driving condition. Furthermore, the provisional origin for calculation matches the origin for calculation when the provisional origin matches the origin; therefore, sufficient steering feeling can be obtained within a short interval.

Further, because the spool is positioned in the provisional origin in the return to origin permission state, the spool is disposed in the origin when the driving of the stepping motor according to the number of steps obtained by subtracting the number of steps for setting provisional origin from the number of steps for setting origin is completed, and the value of the number of steps at this time can be set to the origin for calculation. As a result, the provisional origin can be reliably matched with the origin. Moreover, because the origin for calculation is set when the vehicle driving condition under which the movement of the spool from the provisional origin in the other direction is not required is satisfied, such setting can be performed without unfavorable effect on the steering feeling.

It is preferred that when the return to origin permission state is dissolved during the driving of the stepping motor according to the number of steps obtained by subtracting the number of steps for setting provisional origin from the number of steps for setting origin, a number of steps at this time is set to a new provisional origin for calculation, on the assumption that the spool is positioned in a new provisional origin at this time. As a result, even when the provisional origin does not match the origin, the difference between the provisional origin for calculation and the origin for calculation can be gradually decreased before the origin for calculation is set, and the unfavorable effect on the steering feeling can be reduced.

It is preferred that the vehicle driving condition includes the vehicle speed, and the amount of movement of the spool from the provisional origin or the origin in the other direction increases with the increase in the vehicle speed. As a result, the vehicle speed is usually zero or close to zero when the control of the stepping motor is completed; therefore, the spool is disposed in the origin or close thereto. As a result, in the usual case, the provisional origin can be matched with the origin by stopping the movement of the spool with the stopper when the driving of the stepping motor according to the number of steps for setting provisional origin is completed in the initial stage of the next control, and thus sufficient steering feeling can be obtained within a short period.

In this case, it is preferred that the hydraulic pressure acting on a hydraulic actuator for generating steering assist power is decreased with the increase in the amount of movement of the spool from the provisional origin or the origin in the other direction, and the control of the stepping motor is started when the vehicle speed becomes equal to or less than a preset value. As a result, when the ignition switch is turned on during the vehicle travels by inertia, for example, in downhill, the spool does not move in the direction for increasing the steering assist power to set the provisional origin for calculation, and thus the increase in steering assist power at the time when the vehicle speed increases can be prevented and the steering stability can be maintained.

With the hydraulic power steering apparatus in accordance with the present invention, the interval in which the control of the steering assist power corresponding to the driving condition is restricted at the initial stage of the driving of the vehicle can be shortened, and the steering feeling can be improved.

BRIEF DESCRIPTION OF THE DRAWINGS

[FIG. 1] A vertical sectional view of the hydraulic power steering apparatus of an embodiment of the present invention

[FIG. 2] A hydraulic circuit of the hydraulic power steering apparatus of the embodiment of the present invention

[FIG. 3] An explanatory drawing illustrating a lateral sectional structure of a control valve in the hydraulic power steering apparatus of the embodiment of the present invention

[FIG. 4] An expanded view of the control valve in the hydraulic power steering apparatus of the embodiment of the present invention

[FIG. 5] A partially enlarged view of the control valve in the hydraulic power steering apparatus of the embodiment of the present invention

[FIG. 6] A vertical sectional view of the variable throttle portion of a variable throttle valve in the open state thereof in the embodiment of the present invention

[FIG. 7] A vertical sectional view of the variable throttle portion of the variable throttle valve in a closed state thereof in the embodiment of the present invention

[FIG. 8] A drawing showing relationships of circuit voltage of a control device, ON/OFF state of an alarm lamp, vehicle speed, and position of the spool from the origin to time that is elapsed after an ignition switch is turned on in the hydraulic power steering apparatus of the embodiment of the present invention

[FIG. 9] Another drawing showing relationships of circuit voltage of the control device, ON/OFF state of the alarm lamp, vehicle speed, and position of the spool from the origin to time that is elapsed after the ignition switch is turned on in the hydraulic power steering apparatus of the embodiment of the present invention

[FIG. 10] The other drawing showing relationships of circuit voltage of the control device, ON/OFF state of the alarm lamp, vehicle speed, and position of the spool from the origin to time that is elapsed after the ignition switch is turned on in the hydraulic power steering apparatus of the embodiment of the present invention

[FIG. 11] A flowchart showing a control sequence of the stepping motor with the control device of the hydraulic power steering apparatus of the embodiment of the present invention

[FIG. 12] A flowchart showing a control sequence of the stepping motor with the control device of the hydraulic power steering apparatus of the embodiment of the present invention

[FIG. 13] A drawing showing a relationship between degree of opening of the throttle portion of the control valve and relative rotation angle of valve members in the hydraulic power steering apparatus of the embodiment of the present invention

DETAILED DESCRIPTION OF THE INVENTION

In a rack and pinion type hydraulic power steering apparatus 1 shown in FIG. 1, a torsion bar 6 that is connected via a pin 4 to an input shaft 2 joined to a steering wheel that is not shown in the figure is joined via serrations 5 to an output shaft 3. The input shaft 2 is supported via a bearing 8 by a valve housing 7 and supported via a bushing 12 by the output shaft 3. The output shaft 3 is supported via bearings 10, 11 by a rack housing 9. Vehicle wheels for steering that are not shown in the figure are joined to a rack 16 engaged with a pinion 15 formed in the output shaft 3. As a result, by the transmission of the rotation of the input shaft 2 caused by steering operation via the torsion bar 6 and output shaft 3, the pinion 15 is rotated and the rack 16 moves in the lateral direction of the vehicle, thereby steering angle of the vehicle varies.

A hydraulic cylinder 20 is provided as a hydraulic actuator for generating steering assist power. The hydraulic cylinder 20 comprises a cylinder tube formed by a rack housing 9 and a piston 21 integrated with the rack 16. A rotary type hydraulic control valve 30 is provided to supply hydraulic fluid according to steering resistance to oil chambers 22, 23 that are partitioned by the piston 21. In the control valve 30, a cylindrical first valve member 31 that is inserted into the valve housing 7 so as to be able to rotate relatively is joined via a pin 29 to the output shaft 3 so as to rotate together, and a second valve member 32 that is inserted into the first valve member 31 coaxially so as to be able to rotate relatively is formed integrally with the outer peripheral portion of the input shaft 2 so as to rotate together. An inlet port 34 connected to a pump 70, a first port 37 connected to one oil chamber 22 of the hydraulic cylinder 20, a second port 38 connected to the other oil chamber 23, a first outlet port 36 connected to a tank 71, and a second outlet port 61 connected to the tank 71 via a variable throttle valve 60 are provided in the valve housing 7, and are connected to each other via flow paths provided between the inner periphery of the valve member 31 and the outer periphery of the valve member 32.

As shown in FIG. 3 and FIG. 4, on the inner periphery of the first valve member 31, a plurality of right steering grooves 50a are connected via flow paths 53 and the first port 37 to the oil chamber 22, a plurality of left steering grooves 50b are connected via flow paths 54 and the second port 38 to the oil chamber 23, and a plurality of communication grooves 50c are formed. On the outer periphery of the second valve member 32, a plurality of hydraulic fluid supply grooves 51a are connected to the pump 70 via hydraulic fluid supply paths 55 and the inlet port 34, a plurality of first hydraulic fluid discharge grooves 51b are connected to the tank 71 via a flow path 52b (see FIG. 1) and the first outlet port 36 through a space between the input shaft 2 and the torsion bar 6 from the flow paths 52a, and a second hydraulic fluid discharge grooves 51c are connected to the variable throttle valve 60 via flow paths 59 and the second outlet port 61. The grooves are disposed with spacing to each other in the circumferential direction, the first hydraulic fluid discharge grooves 51b are disposed between the right steering grooves 50a and the left steering grooves 50b, the second hydraulic fluid discharge grooves 51c are disposed between the communication grooves 50c, and the hydraulic fluid supply grooves 51a are disposed between the right steering grooves 50a and the communication grooves 50c and between the left steering grooves 50b and the communication grooves 50c. Throttle portions A, A', B, B', C, C', D, D' are formed between the edges along the axial direction of the grooves 50a, 50b, 50c formed in the first valve member 31 and the edges along the axial direction of the grooves 51a, 51b, 51c formed in the second valve member 32.

As shown in FIG. 5, the edges along the axial direction of grooves 51a, 51b, 51c formed in the second valve member 32 have chamfered portions. As shown in FIG. 4 and FIG. 5, a width W of the chamfered portions (surrounded by □ in FIG. 3) of the edges along the axial direction of the hydraulic fluid supply grooves 51a in the throttle portions A', C' between the hydraulic fluid supply grooves 51a and the communication grooves 50c, a width W' of the chamfered portions (surrounded by Δ in FIG. 3) of the edges along the axial direction of the second hydraulic fluid discharge grooves 51c in the throttle portions B', D' between the communication grooves 50c and the second hydraulic fluid discharge grooves 51c, and a width W'' of the chamfered portions (surrounded by ○ in FIG. 3) of the edges along the axial direction of the other grooves formed in the second valve member 32 satisfy the relationship W>W'>W''. In comparing the relative rotation angles (i.e. closure angles) of the two valve members 31, 32 required to close completely the throttle portions A, A', B, B', C, C', D, D' from a state in which there is no steering resistance (that is a state shown in FIG. 4 and FIG. 5), a closure angle θr of the throttle portions A', C' is larger than a closure angle θs of the throttle portions B', D', and the closure angles θr, θs are larger than the closure angle θt of the other throttle portions A, B, C, D. As a result, the throttle portions located between the first valve member 31 and the second valve member 32 can be divided into a first group consisting of a plurality of throttle portions A, B, C, D and a second group consisting of a plurality of throttle portions A', B', C', D' that have a closure angle larger than that of the throttle portions A, B, C, D that belong to the first group, and the steering resistance required to close the throttle portions A', B', C', D' that belong to the second group is larger than the steering resistance required to close the throttle portions A, B, C, D that belong to the first group. Further, the throttle portions that belong to the second group are divided into two types, i.e., throttle portions B', D' and throttle portions A', C' that have a closure angle larger than that of the throttle portions B', D'.

The two valve members 31, 32 are elastically rotated by torsion of the torsion bar 6 due to the steering resistance, so that the degree of opening of the throttle portions A, B, C, D, A', B', C', D' vary, and the hydraulic pressure acting on the hydraulic cylinder 20 varies according to the variation in this degree of opening, with the result that the steering assist power corresponding to the steering resistance is generated. FIG. 4 shows a state in which no steering operation is performed, wherein the throttle portions A, B, C, D, A', B', C', D' located between the two valve members 31, 32 are completely open, the inlet port 34 and the outlet ports 36, 61 communicate with each other via a flow path 27 between the valve members, the oil flowing from the pump 70 to the control valve 30 returns to the tank 71, and no steering assist power is generated. In a case where the two valve members 31, 32 rotate due to the steering resistance generated by steering operation to the right, as shown in FIG. 3, the degree of opening of the throttle portions A, A' increases, the degree of opening of the throttle portions B, B' decreases, the degree of opening of the throttle portions C, C' decreases, and the degree of opening of the throttle portions D, D' increases. As a result, the hydraulic 10 fluid, the pressure of which corresponds to the steering resistance, is supplied to the oil chamber 22 for generating right steering assist power in the hydraulic cylinder 20 due to the flow of the hydraulic fluid shown by arrows in the figure, while the hydraulic fluid flows back from the oil chamber 23 for generating left steering assist power to the tank 71, with the result that the steering assist power for turning the vehicle to the right is applied from the hydraulic cylinder 20 to the rack 16. In a case where the vehicle is steered to the left, the first valve member 31 and the second valve member 32 rotate in the direction opposite to the direction in the case where it is steered to the right, the degree of opening of the throttle portions A, A' decreases, the degree of opening of the throttle portions B, B' increases, the degree of opening of the throttle portions C, C' increases, and the degree of opening of the throttle portions D, D' decreases; therefore, the steering assist power for turning the vehicle to the left is applied from the hydraulic cylinder 20 to the rack 16.

As shown in FIG. 1 and FIG. 6, the variable throttle valve 60 communicating with the second outlet port 61 has a second valve housing 7' joined to the valve housing 7, a spool (movable member) 62 inserted into an insertion hole 66 formed in the second valve housing 7' so as to be able to move linearly along the axial direction (up-down direction in FIG. 1 and FIG. 6), a threaded member 64 screwed into the spool 62, and a stepping motor 80 that rotates the threaded member 64. Since the central axis of the threaded member 64 is parallel to the central axis of the spool 62 so that the two central axes are mutually eccentric, whereby the spool 62 is prevented from rotating concurrently with the threaded member 64 when the threaded member 64 rotates. The two central axes can also coincide with each other, if the concurrent rotation can be prevented, for example, by providing the second valve housing 7' with a protrusion that is fitted in an axial groove formed in the outer periphery of the spool 62 so as to be able to move relatively in the axial direction. A circumferential groove 62a is formed in the outer periphery of the spool 62, a circumferential groove 66a is formed in the inner periphery of the insertion hole 66, and the space between the two circumferential grooves 62a, 66a serves as a variable throttle portion 67. The degree of opening of the variable throttle portion 67 is varied by the linear movement of the spool 62 in the axial direction.

A control device 100 constituted of a computer mounted in the vehicle is provided as means for driving the stepping motor 80 according to the number of steps. The control device 100 is connected to a vehicle speed sensor 101 that detects vehicle speed as a vehicle driving condition, and sends a pulse signal corresponding to the number of steps that corresponds to the detected vehicle speed to the motor 80. As a result the stepping motor 80 is driven so as to be rotated according to the number of steps corresponding to the vehicle speed, and the stepping motor 80 rotates the threaded member 64 in one rotation direction when the vehicle speed is low to displace the spool 62 in one direction (downward direction in the figure), and rotates the threaded member 64 in the other rotation direction when the vehicle speed increases to displaces the spool 62 in the other direction (upward direction in the figure). As a result, because the spool 62 is displaced upward direction in the figure when the vehicle speed is high, the degree of opening of the variable throttle portion 67 increases as shown in FIG. 6, while because the spool 62 is displaced downward direction when the vehicle speed is low, the degree of opening thereof decreases as shown in FIG. 7.

A communication path 58 through which the circumferential groove 66a in the inner periphery of the insertion hole 66 communicates with the second outlet port 61 is formed in the second valve housing 7'. A diametrical hole 62c through which the circumferential groove 62a in the outer periphery of the spool 62 communicates with a through hole 62d of the spool 62 is formed in the spool 62. The through hole 62d of the spool 62 communicates with a space below the spool 62 in the insertion hole 66. A communication flow path 76 through which the space below the spool 62 communicates with the first outlet port 36 is formed in the valve housing 7 and the second valve housing 7' so as to be located by the spool 62 in the diametrical direction. A drain flow path 62h is formed parallel to the through hole 62d in the spool 62 so that the space above the spool 62 communicates with the space below the spool. As a result, the hydraulic fluid supplied from the pump 70 reaches the variable throttle portion 67 via the flow path 27 between the valve members, the second outlet port 61, and the communication path 58, and then reaches the tank 71 from the variable throttle portion 67 via the communication path 76 and the first outlet port 36. As a result, a hydraulic circuit shown in FIG. 2 is formed. To be more precise, the throttle portions A, B, C, D that belong to the first group in the hydraulic control valve 30 and the throttle portions A', B', C', D' that belong to the second group are parallel to each other. The variable throttle portion 67 of the variable throttle valve 60 is disposed in series with the throttle portions A', B', C', D' that belong to the second group between them and the tank 71. The variable throttle valve 60 is connected in series with the throttle portions A', B', C', D' that belong to the second group so that it is possible to vary a ratio of the flow rate of hydraulic fluid that is controlled by the throttle portions A, B, C, D belonging to the first group to the flow rate of hydraulic fluid that is controlled by the throttle portions A', B', C', D' belonging to the second group. As a result, the hydraulic pressure for generating the steering assist power can be varied by varying the degree of opening of the variable throttle portion 67.

As shown in FIG. 6 and FIG. 7, one end of the insertion hole 66 is closed by a stopper 68 that is screwed into the second valve housing 7', and the other end of the insertion hole is closed by a cover 94'. As shown in FIG. 7, the linear movement of the spool 62 in the one direction to decrease the degree of opening of the variable throttle portion 67 is stopped by the stopper 68. The position at which the movement of the spool 62 is stopped by the stopper 68 is treated as an origin. The amount of screwing of the stopper 68 into the second valve housing 7' is able to be varied, so that the position of the origin can be adjusted so as to be varied. A compression coil spring 90 is disposed between the spool 62 and the stopper 68 to prevent the spool 62 from shaking.

The control device 100 stores a predetermined number of steps that is required to move the spool 62 by the stepping motor 80 to the origin as a number of steps for setting origin. It is preferred that the number of steps for setting origin is set on the assumption that the spool 62 is disposed in a position farthest from the origin, so that the spool 62 can be reliably moved to the origin when the control of the stepping motor 80 is started. In the present embodiment, the number of steps at the time when the spool 62 is disposed farthest from the origin is set to 217 steps, and the number of steps for setting origin is set to 220 steps. As a result, even after the movement of the spool 62 is stopped by the stopper 68, the stepping motor 80 rotates in a step-out state; therefore the spool 62 can be reliably positioned in the origin.

The control device 100 stores a number of steps that is less than the number of steps for setting origin and is predetermined for moving the spool 62 in the one direction from a position at a time when the control of the stepping motor 80 starts as a number of steps for setting provisional origin. The number of steps for setting provisional origin in the present embodiment is set to 70 steps, but this number is not particularly limited, provided that it is less than the number of steps for setting origin and makes it possible to shorten the interval in which the control of the steering assist power according to the driving condition is restricted at the initial stage of the control.

The control device 100 sets a number of steps at a time when the driving of the stepping motor 80 according to the number of steps for setting provisional origin is completed to a provisional origin for calculation, on the assumption that the spool 62 is positioned in a provisional origin at this time. FIG. 8 shows relationship of circuit voltage V of the control device 100, ON/OFF state of an alarm lamp (not shown in the figure), vehicle speed v, and a position of the spool 62 from the origin to time t that is elapsed after the ignition switch is turned on.

In FIG. 8, the vehicle speed v is treated as zero. In a state in which the steering assist power is not controlled according to the vehicle driving condition after the control with the control device 100 is started, the alarm lamp is lighted to warn the driver. When a circuit voltage V reaches a value Va necessary for the control with the elapse of time $t_0$ since the ignition switch of the vehicle is on, the alarm lamp is turned on and the control of the stepping motor 80 with the control device 100 is started. By driving the stepping motor 80 according to the number of steps, the movement of the spool 62 in the one direction starts from a position $P_A$ at the time when the control of the stepping motor 80 is started. When the stepping motor 80 is driven so as to be rotated by the number of steps for setting provisional origin (70 steps) with the elapse of time $t_1$, the position $P_B$ of the spool 62 at this time is treated as the provisional origin, and the value of the number of steps at this time is set to, for example, zero as a provisional origin for calculation and stored in the control device 100. As a result, the control device 100 becomes a state in which a number of steps from the provisional origin for calculation that corresponds to an amount of movement of the spool 62 from the provisional origin in the other direction is set according to vehicle driving condition, and the steering assist power is controlled according to the driving condition therefore, the alarm lamp is turned off. The spool 62 is positioned by driving the stepping motor 80 according to the number of steps from the provisional origin for calculation set according to the vehicle driving condition. Here, the amount of movement of the spool 62 from the provisional origin in the other direction increases with the increase in the vehicle speed v, and the hydraulic pressure acting on the hydraulic cylinder 20 decreases with the increase in the amount of movement of the spool 62 from the provisional origin in the other direction provided that the steering resistance is even. The vehicle driving condition in the present embodiment is vehicle speed, but other driving condition such as a steering angle can be also included in addition to the vehicle speed, or other driving condition such as a steering angle can be adopted instead of the vehicle speed as the vehicle driving condition. The control device 100 judges whether it is in a return to origin permission state in which conditions for return to the origin are satisfied, these conditions include a condition that the spool 62 is disposed in the provisional origin and a condition that the number of steps from the provisional origin for calculation set according to the vehicle driving condition is zero. In the present embodiment, the conditions for return to the origin are satisfied when the spool 62 is disposed in the provisional origin and the vehicle speed v is zero, but alternatively, the conditions for return to the origin can be also satisfied when the spool 62 is disposed in the provisional origin and the vehicle speed v is equal to or less than a value larger than zero. Further, the conditions for return to the origin can be also satisfied by satisfying an additional condition. For example, a condition that the control device 100 is not in a failsafe control mode is adopted as the additional condition, and the conditions for return to the origin are not satisfied in the failsafe control mode in which the control device 100 disposes the spool 62 in a position farthest from the origin in the other direction by the failsafe control when no signal from the vehicle speed sensor 101 is inputted into the control device 100.

In the return to origin permission state, the control device 100 sets a number of steps at a time when the driving of the stepping motor 80 according to a number of steps obtained by subtracting the number of steps for setting provisional origin from the number of steps for setting origin is completed to an origin for calculation. As shown in FIG. 8, in a case where it is in the return to origin permission state when the provisional origin for calculation is set with an elapse of time $t_1$, if the driving of the stepping motor 80 is continued and the stepping motor 80 is driven so as to be rotated by the number of steps (150 steps) obtained by subtracting the number of steps for setting provisional origin from the number of steps for setting origin in the return to origin permission state, the spool 62 is positioned in the origin $P_c$ with an elapse of time $t_2$, and the value of the number of steps at this time is set to, for example, zero as an origin for calculation and stored in the control device 100. After this origin for calculation is set, instead of the number of steps from the provisional origin for calculation, the number of steps from the origin for calculation corresponding to the amount of movement of the spool 62 from the origin in the other direction is set by the control device 100 according to the vehicle driving condition. As a result, the spool 62 is positioned by driving the stepping motor 80 according to the number of steps from the origin set according to the vehicle driving condition. Here, the amount of movement of the spool 62 from the origin in the other direction increases with the increase in the vehicle speed v, and the hydraulic pressure acting on the hydraulic cylinder 20 decreases with the increase in the amount of movement of the spool 62 from the origin in the other direction provided that the steering resistance is even.

In the control device 100, when the return to origin permission state is dissolved during the driving of the stepping motor 80 according to the number of steps obtained by subtracting the number of steps for setting provisional origin from the number of steps for setting origin, a number of steps at this time is set to a new provisional origin for calculation on the assumption that the spool 62 is positioned in a new provisional origin at this time.

For example, as shown in FIG. 9, it is assumed that after the provisional origin for calculation is set with an elapse of time $t_1$, the return to origin permission state is dissolved because the vehicle speed v exceeds zero at the time when time $t_3$ elapses, and the vehicle speed v reaches $v_a$, and then it becomes to the return to origin state when the vehicle speed v becomes to zero at the time when time $t_4$ elapses. In this case, a position $P_B'$ of the spool 62 at the time when time $t_3$ elapses is treated as a new provisional origin, and a number of steps at this time is set to, for example, zero as a new provisional origin for calculation and stored anew in the control device 100. As a result, after the elapse of time $t_3$ and before the elapse of time $t_4$, the control device 100 sets the number of steps from the new provisional origin for calculation corresponding to the amount of movement of the spool 62 in the other direction from the provisional origin according to the vehicle speed v, and the spool 62 is positioned by the driving of the stepping motor 80 according to the number of steps from the new provisional origin for calculation. Because it becomes to the return to origin permission state with the elapse of time $t_4$, the state in which the stepping motor 80 is driven so as to be rotated by the number of steps (150 steps) obtained by subtracting the number of steps for setting provisional origin from the number of steps for setting origin in the return to origin permission state is realized again, the spool 62 is positioned in the origin $P_c$ with an elapse of time $t_5$, and a number of steps at this time is set to an origin for calculation that is set to, for example, zero and stored in the control device 100.

The control of the stepping motor 80 is started when the vehicle speed v is equal to or less than a preset value $v_b$, in the present embodiment, the control is started when the vehicle speed v is equal to or less than 5 km/h. For example, as shown in FIG. 10, in a case where the vehicle travels on a hill or the like at a speed $v_C$ higher than 5 km/h since the ignition switch is turned on, the control of the stepping motor 80 by the control device 100 is not started even if the circuit voltage V reaches the value $V_a$ necessary for control with the elapse of time $t_0$ after turning on the ignition switch of the vehicle. The stepping motor 80 is driven according to the number of steps when the vehicle speed v becomes 5 km/h with an elapse of time $t_0'$, and when the stepping motor 80 is driven so as to be rotated by the number of steps for setting provisional origin (70 steps) with an elapse of time $t_1'$, the position $P_B$ of the spool 62 at this time is treated as a provisional origin, and a provisional origin for calculation is set. In a case where it is in the return to origin permission state after an elapse of the time $t_1'$, if the driving of the stepping motor 80 is continued and the stepping motor is driven so as to be rotated by the number of steps (150 steps) obtained by subtracting the number of steps for setting provisional origin from the number of steps for setting origin in the return to origin permission state, the spool 62 is positioned in the origin $P_c$ with an elapse of time $t_2'$, and the origin for calculation is set.

The flowcharts in FIG. 11 and FIG. 12 show the control procedure of the stepping motor 80 with the control device 100. First, an origin setting flag is turned off (Step S1), the vehicle speed v is read (Step S2), it is judged whether the vehicle speed v is equal to or less than a preset value $v_b$ (Step S3), where the vehicle speed v is greater than $v_b$, the processing flow returns to Step S2 of the control sequence, and where the vehicle speed v is equal to or less than $v_b$, the stepping motor 80 is driven (Step S4), and the spool 62 is moved in the one direction. Then, it is judged whether the number of steps N for rotation of the stepping motor 80 is reached to the number of steps for setting provisional origin (this number is 70 in the present embodiment) (Step S5), if not, the processing flow returns to Step S4 of the control procedure and the driving is continued. If the number of steps N for rotation is reached to the number of steps for setting provisional origin in Step S5 of the control procedure, the number of steps N for rotation at this time is set to zero as the provisional origin for calculation (Step S6), a value α obtained by adding the number of steps N for rotation at the present time to the number of steps for setting provisional origin is found (Step S7), the vehicle speed v is read (Step S8), and it is judged whether it is in the return to origin permission state (Step S9). If the number of steps N for rotation at the present time is zero and the vehicle speed v is zero, it is judged that it is in the return to origin permission state, and if not, it is judged that it is not in the return to origin permission state. When it is judged that it is in the return to origin permission state, the stepping motor 80 is driven (Step S10), the spool 62 is moved in the one direction, and it is judged whether the number of steps N for rotation of the stepping motor 80 is reached to a value obtained by subtracting the value α from the number of steps for setting origin (this number is 220 in the present embodiment) (Step S11), if it is not reached, the processing flow returns to Step S7 of the control procedure. If the number of steps N for rotation is reached to the value obtained by subtracting the value α from the number of steps for setting origin in Step S11 of the control procedure, the number of steps N for rotation at this time is set to zero as the origin for calculation (Step S12), the driving of the stepping motor 80 is stopped (Step S13), the origin setting flag is turned on (Step S14), and it is judged whether the control is to be ended, for example, according to a judgment whether the ignition switch is on or off (Step S15). In a case where it is judged that it is not in the return to origin permission state in Step S9 of the control procedure, the number of steps $N_0'$ from the provisional origin for calculation that corresponds to the amount of movement of the spool 62 in the other direction from the provisional origin is set according to the vehicle driving condition (Step S16). In the present embodiment, because the number of steps at the time when the spool 62 is disposed in a position farthest from the origin is set to 217 steps, the upper limit of $N_0'$ is set so that $N_0'+α$ is equal to or less than 217 steps. Then, the stepping motor 80 is driven (Step S17), and it is judged whether the number of steps N for rotation of the stepping motor 80 is reached to $N_0'$ (Step S18), if it is reached, the processing flow returns to Step S15 of the control procedure and it is judged whether the control is to be ended, if it is not reached, the processing flow returns to Step S8 of the control procedure. If the control is not to be ended in Step S15 of the control procedure, it is judged whether the return to origin flag is on (Step S19), if the return to origin flag is not on, the process flow returns to Step S8 of the control procedure, and if the return to origin flag is on, the vehicle speed v is read (Step S20), and the number of steps $N_0$ from the origin for calculation that corresponds to the amount of movement of the spool 62 from the origin in the other direction is set according to the vehicle driving condition (Step S21). Further, in the present embodiment, because the number of steps at the time when the spool 62 is disposed in the position farthest from the origin is set to 217 steps, the upper limit of $N_0$ is set such that $N_0$ becomes equal to or less than 217 steps. Then, the stepping motor 80 is driven (Step S22), and it is judged whether the number of steps N for rotation of the stepping motor 80 is reached to $N_0$ (Step S23), if it is reached, the driving of the stepping motor 80 is stopped (Step S24), and the processing flow returns to Step S15 of the control procedure and it is judged whether the control is to be ended, if it is not reached, the processing flow returns to Step S20 of the control procedure.

According to the above-described embodiment, in the initial stage of the control of the stepping motor 80, when the driving of the stepping motor 80 according to the number of steps for setting provisional origin is completed, a number of steps at this time is set to a provisional origin for calculation, on the assumption that the spool 62 is positioned in the provisional origin at this time. The number of steps $N_0'$ from the provisional origin for calculation corresponding to the amount of movement of the spool 62 from the provisional origin in the other direction is set according to the vehicle driving condition, and the spool 62 is positioned by driving the stepping motor 80 according to this number of steps $N_0'$, whereby the steering assist power corresponding to the vehicle driving condition can be obtained. Because the number of steps for setting provisional origin is less than the number of steps for setting origin, the provisional origin for calculation can be set faster than the origin for calculation. As a result, the steering assist power corresponding to the vehicle driving condition can be obtained faster than in the conventional apparatuses, and it is possible to shorten the interval in which the control of the stepping motor 80 according to the driving condition is restricted at the initial stage of the driving of the vehicle. Although a difference can occur between the provisional origin for calculation and the origin for calculation because the provisional origin does not always matches the origin, the steering feeling can still be improved in comparison with a case in which the steering assist power does not at all correspond to the vehicle driving condition. Furthermore, the provisional origin for calculation matches the origin for calculation when the provisional origin matches the origin; therefore, sufficient steering feeling can be obtained within a short interval.

Further, because the spool 62 is positioned in the provisional origin in the return to origin permission state, the spool 62 is disposed in the origin when the driving of the stepping motor 80 according to the number of steps obtained by subtracting the number of steps for setting provisional origin from the number of steps for setting origin is completed, and the value of the number of steps at this time can be set to the origin for calculation. As a result, the provisional origin can be reliably matched with the origin. Moreover, because the origin for calculation is set when the vehicle driving condition under which the movement of the spool 62 from the provisional origin in the other direction is not required is satisfied, such setting can be performed without unfavorable effect on the steering feeling.

Further, when the return to origin permission state is dissolved during the driving of the stepping motor 80 according to the number of steps obtained by subtracting the number of steps for setting provisional origin from the number of steps for setting origin, a number of steps at this time is set to a new provisional origin for calculation, on the assumption that the spool 62 is positioned in a new provisional origin at this time as a result, even when the provisional origin does not match the origin, the difference between the provisional origin for calculation and the origin for calculation can be gradually decreased before the origin for calculation is set, and the unfavorable effect on the steering feeling can be reduced.

Because the vehicle driving condition includes the vehicle speed and the amount of movement of the spool 62 from the provisional origin or the origin in the other direction increases with increase in the vehicle speed, the vehicle speed is usually zero or close to zero when the control of the stepping motor 80 is completed; therefore, the spool 62 is disposed in the origin or close thereto. As a result, in the usual case, the provisional origin can be matched with the origin by stopping the movement of the spool 62 with the stopper when the driving of the stepping motor 80 according to the number of steps for setting provisional origin is completed in the initial stage of the next control, and thus sufficient steering feeling can be obtained within a short period.

The hydraulic pressure acting on the hydraulic cylinder 20 for generating steering assist power decreases with the increase in the amount of movement of the spool 62 from the provisional origin or the origin in the other direction, and the control of stepping motor 80 starts when the vehicle speed becomes equal to or less than a preset value therefore, when the ignition switch is turned on during the vehicle travels by inertia, for example, in downhill, the spool 62 does not move in the direction for increasing the steering assist power to set the provisional origin for calculation, and thus the increase in the steering assist power at the time when the vehicle speed increases can be prevented and the steering stability can be maintained.

Further, the maximum value of flow passage area corresponding to the degree of opening of the variable throttle portion 67 is equal to or more than the maximum value of flow passage area of the throttle portions A', B', C', D' that belong to the second group (it is a maximum value of total flow passage area of the throttle portions B', C' during steering to the right, and it is a maximum value of total flow passage area of the throttle portions A', D' during steering to the left), or is increased to a value so that it does not function as a throttle. In the present embodiment, the minimum value of the flow passage area of the variable throttle portion 67 is zero. In FIG. 13, a solid line X shows a variation characteristic of the flow passage area of the throttle portions A, B, C, D that belong to the first group to the relative rotation angle of the two valve members 31, 32 (it is a variation characteristic of the total flow passage area of the throttle portions B, C during steering to the right, and it is a variation characteristic of the total flow passage area of the throttle portions A, D during steering to the left). An alternate long and short dash line U shows a variation characteristic of the flow passage area of the throttle portions A', C' to the relative rotation angle of the two valve members. An alternate long and short dash line V shows a variation characteristic of the flow passage area of the throttle portions B', D' to the relative rotation angle of the two valve members. A solid line Y shows a characteristic obtained by combining the variation characteristic of the flow passage area of the throttle portions A', C' and the variation characteristic of the flow passage area of the throttle portions B', D'. A broken line R shows the flow passage area of the variable throttle portion 67 at the time when the vehicle travels at a medium speed. When the vehicle travels at a low speed, the variable throttle portion 67 is completely closed; therefore, the hydraulic pressure acting on the hydraulic cylinder 20 is controlled according to the variation characteristic line X of the flow passage area of the throttle portions A, B, C, D of the first group. When the vehicle travels at a high speed, the flow passage area of the variable throttle portion 67 reaches a maximum, and the hydraulic pressure acting on the hydraulic cylinder 20 is controlled according to the combined characteristic of the variation characteristic line Y of the flow passage area of the throttle portions A', B', C', D' of the second group and the variation characteristic line X of the flow passage area of the throttle portions A, B, C, D of the first group. When the vehicle travels at a medium speed, the flow passage area of the variable throttle portion 67 is larger than the minimum value and smaller than the maximum value of the flow passage area of the throttle portions A', B', C', D' that belong to the second group, and so the steering assist power is applied according to the characteristic obtained by combining the characteristic line R of the flow passage area of the variable throttle portion 67 with the variation characteristic line X of the flow passage area of the throttle portions A, B, C, D that belong to the first group until the flow passage area of the throttle portions A, B, C, D that belong to the first group becomes zero (until the relative rotation angle becomes $\theta_a$ in FIG. 13), the steering assist power becomes a constant value determined by the flow passage area of the variable throttle portion 67 after the throttle portions A, B, C, D that belong to the first group are completely closed and before the flow passage area of the throttle portions A', B', C', D' that belong to the second group becomes less than the flow passage area of the variable throttle portion 67 (between $\theta_a$ and $\theta_b$ of the relative rotation angle in FIG. 13), and then the steering assist power is applied according to the variation characteristic line Y of the flow passage area of the throttle portions A', B', C', D' that belong to the second group after the flow passage area of the throttle portions A', B', C', D' that belong to the second group becomes less than the flow passage area of the variable throttle portion 67.

The invention claimed is:

1. A hydraulic power steering apparatus, comprising:
   a variable throttle valve that has a variable throttle portion in which the degree of opening is varied by movement of a spool and varies hydraulic pressure for generating steering assist power by this variation of the degree of opening;
   a stepping motor for moving said spool in one direction and another direction;
   means for driving said stepping motor according to a number of steps;
   a stopper that can stop the movement of the spool in the one direction at an origin;

means for storing a predetermined number of steps that is required to move said spool to said origin as a number of steps for setting origin;

means for storing a number of steps that is less than said number of steps for setting origin and is predetermined for moving said spool in the one direction from a position at a time when a control of said stepping motor starts as a number of steps for setting provisional origin;

means for setting a number of steps at a time when the driving of said stepping motor according to said number of steps for setting provisional origin is completed to a provisional origin for calculation, on an assumption that the spool is positioned in a provisional origin at this time;

means for setting a number of steps from said provisional origin for calculation that corresponds to an amount of movement of said spool from said provisional origin in the other direction according to a vehicle driving condition;

means for determining whether it is in a return to origin permission state in which conditions for return to the origin are satisfied, these conditions including a condition that the spool is disposed in the provisional origin and a condition that the number of steps from the provisional origin for calculation set according to the vehicle driving condition is zero; and means for setting a number of steps at a time when the driving of said stepping motor according to a number of steps obtained by subtracting said number of steps for setting provisional origin from said number of steps for setting origin is completed to an origin for calculation, in said return to origin permission state;

wherein instead of the number of steps from said provisional origin for calculation, the number of steps from said origin for calculation that corresponds to an amount of movement of said spool from said origin in the other direction is set according to the vehicle driving condition, after said origin for calculation is set; and said spool is positioned by driving said stepping motor according to the number of steps that is set according to the vehicle driving condition.

2. The hydraulic power steering apparatus according to claim 1, wherein when the return to origin permission state is dissolved during the driving of said stepping motor according to the number of steps obtained by subtracting said number of steps for setting provisional origin from said number of steps for setting origin, a number of steps at this time is set to a new provisional origin for calculation, on an assumption that the spool is positioned in a new provisional origin at this time.

3. The hydraulic power steering apparatus according to claim 2, wherein said vehicle driving condition includes vehicle speed;

the amount of movement of said spool from said provisional origin or said origin in the other direction increases with increase in the vehicle speed;

the hydraulic pressure acting on a hydraulic actuator for generating steering assist power is decreased with the increase in the amount of movement of said spool from said provisional origin or said origin in the other direction; and the control of said stepping motor is started when the vehicle speed becomes equal to or less than a preset value.

4. The hydraulic power steering apparatus according to claim 1, wherein a number of steps at a time when the return to origin permission state is dissolved during the driving of said stepping motor according to the number of steps obtained by subtracting said number of steps for setting provisional origin from said number of steps for setting origin is set to a new provisional origin for calculation, on an assumption that the spool is positioned in a new provisional origin at this time;

said vehicle driving condition includes vehicle speed; and an amount of movement of said spool from said provisional origin or said origin in the other direction increases with increase in the vehicle speed.

5. The hydraulic power steering apparatus according to claim 1, wherein said vehicle driving condition includes vehicle speed; and the amount of movement of said spool from said provisional origin or said origin in the other direction increases with increase in the vehicle speed.

6. The hydraulic power steering apparatus according to claim 5, wherein the hydraulic pressure acting on a hydraulic actuator for generating steering assist power is decreased with the increase in the amount of movement of said spool from said provisional origin or said origin in the other direction; and the control of said stepping motor is started when the vehicle speed becomes equal to or less than a preset value.

* * * * *